United States Patent
Fujino

(10) Patent No.: US 6,175,115 B1
(45) Date of Patent: Jan. 16, 2001

(54) METHOD AND APPARATUS FOR CATCHING INFRARED RAYS IN ON-VEHICLE SIGNAL TRANSMISSION SYSTEM USING INFRARED RAYS

(75) Inventor: Shouji Fujino, Tokyo (JP)

(73) Assignee: Temco Japan Co., Ltd., Tokyo (JP)

( * ) Notice: Under 35 U.S.C. 154(b), the term of this patent shall be extended for 0 days.

(21) Appl. No.: 09/159,671

(22) Filed: Sep. 24, 1998

(51) Int. Cl.$^7$ ........................................ G01F 5/06
(52) U.S. Cl. ....................... 250/347; 250/214 AL; 359/159
(58) Field of Search .............. 250/347, 214 AL; 359/159

(56) References Cited

U.S. PATENT DOCUMENTS 5,072,209 * 12/1991 Hori et al. .......................... 340/432
5,583,485 * 12/1996 Van Lente et al. .................. 340/525
5,627,669 * 5/1997 Orino et al. ......................... 359/156

* cited by examiner

Primary Examiner—Constantine Hannaher
Assistant Examiner—Otilia Gabor
(74) Attorney, Agent, or Firm—Browdy and Neimark

(57) ABSTRACT

In the method and apparatus, a light receiving element 1 is prevented from being exposed to the direct light of the sun so that a signal is transmitted by means of infrared rays in a favorable and steady manner. a transmitter 4 carried by a driver emits the infrared rays 6, 7 toward a floor surface of the vehicle. The light receiving element 1 is oppositely disposed from such floor surface to receive a reflected component of the infrared rays 6, 7. The apparatus comprises: the transmitter 4, which is carried by the driver and provided with a light emitting element 5 for emitting the infrared rays 6, 7 toward the floor surface; and, a receiver 3 installed in a front panel of the vehicle, in which receiver 3 the light receiving element 1 is mounted.

6 Claims, 3 Drawing Sheets

FIGURE 3
(PRIOR ART)
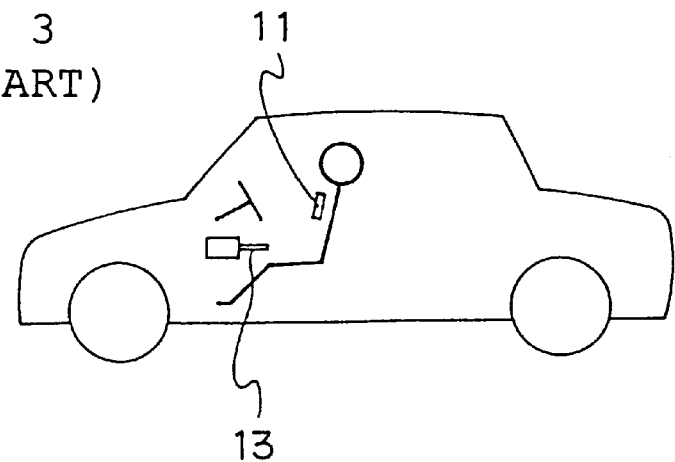
FIGURE 4A
(PRIOR ART)
FIGURE 4B
(PRIOR ART)
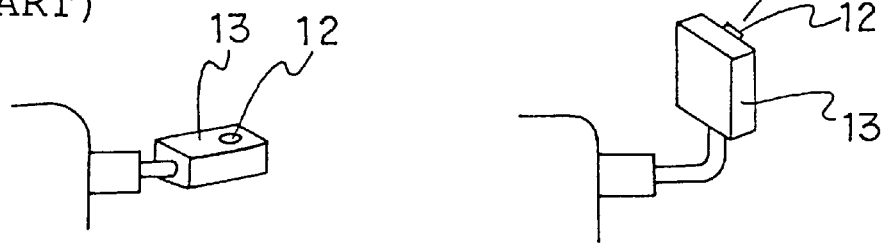

METHOD AND APPARATUS FOR CATCHING INFRARED RAYS IN ON-VEHICLE SIGNAL TRANSMISSION SYSTEM USING INFRARED RAYS

BACKGROUND OF THE INVENTION

1. Field of the Invention

The present invention relates to a method and apparatus for catching infrared rays in an on-vehicle signal transmission system such as transceivers and the like using the infrared rays, the system being mounted inside a vehicle.

2. Description of the Related Art

Heretofore, as a means for releasing a user's or driver's both hands from his on-vehicle transceiver to provide a hands-free type on-vehicle transceiver, a transmitter 11 using infrared rays for transmitting a sound and a PTT control signal have been used, as shown in FIG. 3.

In a conventional on-vehicle signal transmission system, as shown in FIGS. 4(A) and 4(B), a light receiving element 12 receives infrared rays issued from the transmitter 11, which is carried by the driver. In construction, the light receiving element 12 is disposed in an appropriate surface of a receiver 13 mounted in a front panel and like members of the vehicle. Such appropriate surface of the receiver 13 is a surface oppositely disposed from the transmitter 11, for example such as an upper surface of the receiver 13 as viewed in FIG. 4(A), or a front surface of the receiver 13 as viewed in FIG. 4(B).

In any of the conventional on-vehicle signal transmission systems each having the above construction, sunlight is apt to directly hit the light receiving element 12. Due to this, the conventional systems often malfunction or become inoperative. Of these conventional systems, one called "Directly-plug-in-cigarette-lighter type" has been widely used since this type of system requires least wiring in installation. However, this type of system is most affected by the direct light of the sun.

As described above, the conventional signal transmission system using the infrared rays is affected by the direct light of the sun, and often becomes inoperative or malfunctions. The principal cause of such malfunction is to be sought in the fact that the light receiving element 12 is completely saturated with the direct light of the sun. In other words, it is possible to discriminate a desired signal from other signals, provided that the light receiving element 12 is not saturated.

SUMMARY OF THE INVENTION

Under such circumstances, the present invention was made. Consequently, it is an object of the present invention to provide a method and apparatus for catching infrared rays in an on-vehicle signal transmission system such as transceivers and the like using the infrared rays, wherein the system is mounted inside a vehicle and free from any affection of the direct sunlight to perform a signal transmission using the infrared rays in a good and stable manner.

According to a first aspect of the present invention, the above object of the present invention is accomplished by providing:

A method for catching infrared rays in an on-vehicle signal transmission system using the infrared rays, comprising the steps of:

emitting the infrared rays from a transmitter toward a floor surface of the vehicle, the transmitter being carried by a driver of a vehicle; and installing a light receiving element in the vehicle in a manner such that the light receiving element is oppositely disposed from the floor surface, the light receiving element being adapted to receive the infrared rays.

According to a second aspect of the present invention, the above object of the present invention is accomplished by providing:

An apparatus for catching infrared rays in an on-vehicle signal transmission system using the infrared rays, comprising:

a transmitter carried by a driver of a vehicle, the transmitter being provided with a light emitting element adapted to emit the infrared rays toward a floor surface of the vehicle; and a receiver provided with a light receiving element, the light receiving element being installed in the vehicle in a manner such that the light receiving element is oppositely disposed from the floor surface so as to receive the infrared rays.

According to a third aspect of the present invention, the above object of the present invention is accomplished by providing:

The apparatus as set forth in the second aspect of the present invention, wherein:

a reflecting plate is mounted on the receiver; and the reflecting plate reflects the infrared rays toward the light receiving element, the infrared rays having been reflected from clothes of the driver, the vehicle's seat and floor, and like members of the vehicle.

According to a fourth aspect of the present invention, the above object of the present invention is accomplished by providing:

The apparatus as set forth in the third aspect of the present invention, wherein:

the reflecting plate is adjustable in its angle of reflection.

BRIEF DESCRIPTION OF THE DRAWINGS

FIG. 3 is a schematic diagram of the conventional system, in which the conventional method is carried out;

FIG. 4(A) is a perspective view of a conventional system, in which the light receiving element is mounted on an upper surface of the receiver; and FIG. 4(B) is a perspective view of another conventional system, in which the light receiving element is mounted on a front surface of the receiver.

DESCRIPTION OF THE PREFERRED EMBODIMENTS

Hereinbelow, the present invention will be described in detail with reference to the accompanying drawings.

In the present invention, in general, in order to prevent a light receiving element 1 from being directly exposed to the light of the sun, the light receiving element 1 is so arranged as to be oppositely disposed from a floor surface of a vehicle, and the infrared rays emitted by a light emitting element 5 are directed to the floor surface so as to enable the light receiving element 1 to receive a reflected component of the infrared rays 6 thus emitted by the light emitting element 5 and reflected by the floor surface.

Figure 1:
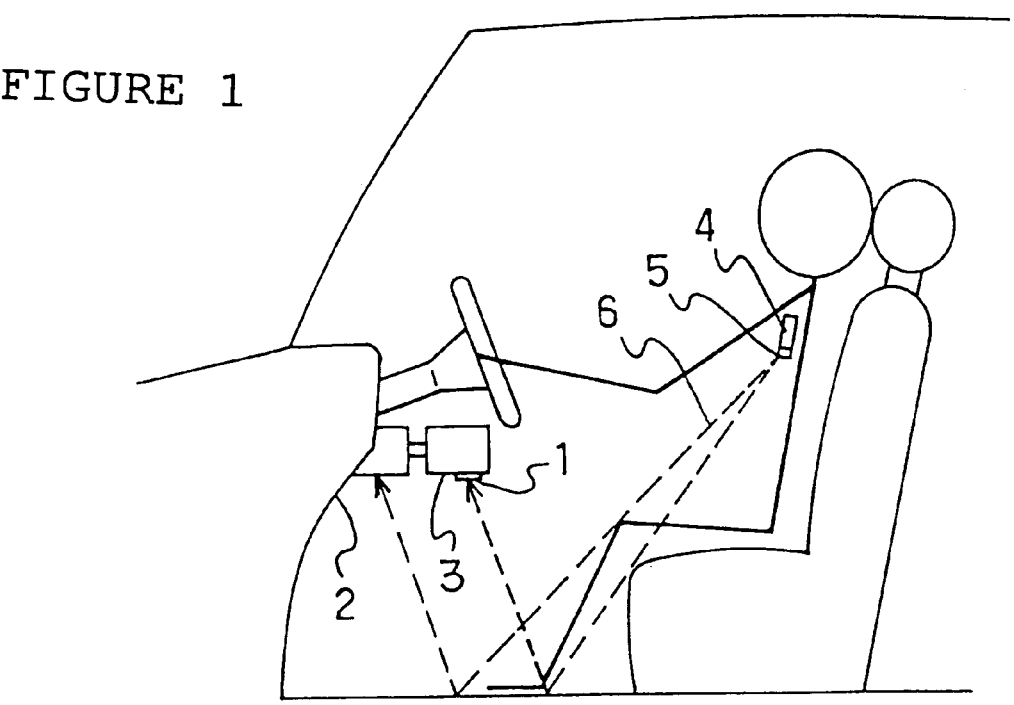
FIG. 1 is a schematic diagram of an embodiment of the system of the present invention, in which an embodiment of the method of the present invention is carried out.

FIG. 1 is a schematic diagram of a method and apparatus of the present invention for catching the infrared rays in an on-vehicle signal transmission system of the present invention such as transceivers and the like using the infrared rays 6, the system being mounted inside a vehicle.

As shown in FIG. 1, in the on-vehicle signal transmission system of the present invention, the light receiving element 1 is mounted on a bottom surface of a front projection of a signal receiving unit 3.

On the other hand, a transmitter 4 is carried by a user or driver of the vehicle. Preferably, the transmitter 4 is mounted on a seat belt worn across the breast of the driver and like members of a vehicle's seat, and has its light emitting element 5 emit the infrared rays 6 toward the floor surface of the vehicle. The thus emitted infrared rays 6 are reflected from the floor surface of the vehicle to produce a reflected component, which reaches the light receiving element 1 and is caught thereby.

In the on-vehicle signal transmission system having the above construction, the component of the infrared rays 6 thus reflected from the floor surface of the vehicle so as to reach the light receiving element 1 is too little in amount. Consequently, in this system of the present invention shown in FIG. 1, there is a fear that the light receiving element 1 fails to receive such reflected component of the infrared rays 6.

Figure 2:
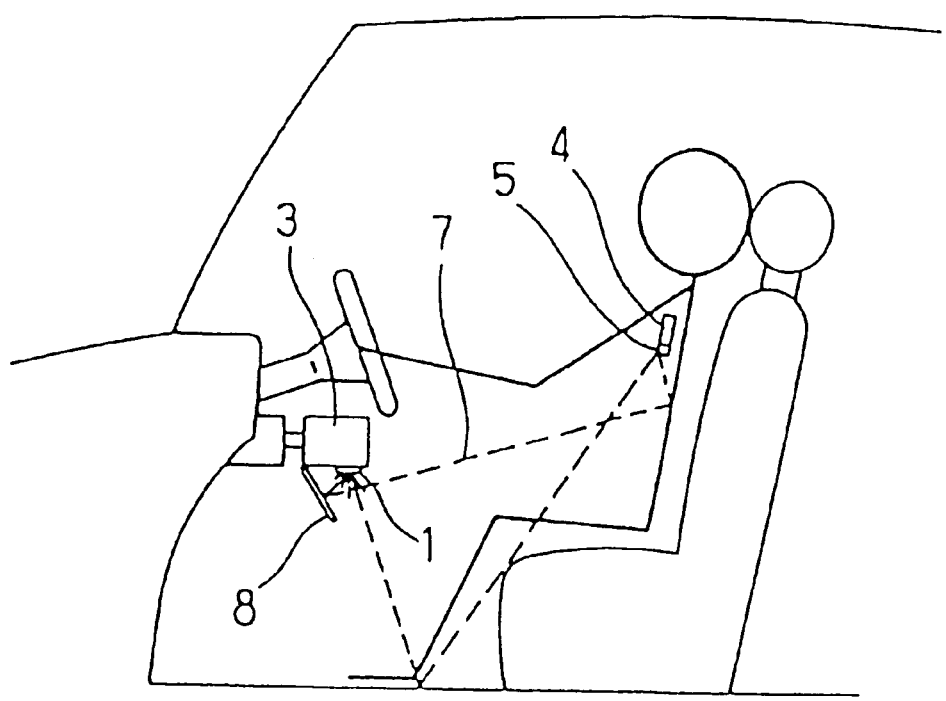
FIG. 2 is a schematic diagram of another embodiment of the system of the present invention, in which another embodiment of the method of the present invention is carried out.

In order to increase in amount such reflected component of the infrared rays 6 reaching the light receiving element 1, as shown in FIG. 2, preferably, an additional means such as a reflecting plate 8 is mounted on the bottom side of the light transmitting unit 3.

In operation, the reflecting plate 8 thus mounted on the bottom side of the light transmitting unit 3 reflects the infrared rays 7 toward the light receiving element 1, which rays 7 have been: emitted from the light emitting element 5 of the transmitter 4 mounted on the seat belt worn across the driver and like members of the vehicle's seat; and, reflected from clothes of the driver, vehicle's seat, floor surface and like members of the vehicle toward the light receiving element 1.

Preferably, the reflecting plate 8 is rotatably mounted on the bottom side of the light transmitting unit 3 so as to be adjustable in angle of reflection in a vertical plane with respect to the infrared rays 7. In other words, by adjusting its angle of reflection as to the infrared rays 7, the reflecting plate 8 is capable of arbitrarily adjusting in amount the reflected component of the infrared rays 7, which improves the light receiving element 1 in photosensitivity as to the reflected component of the infrared rays 7 in a condition in which the light receiving element 1 is free from the direct affection of the sunlight.

As described above, in the present invention, since the light receiving element 1 is oppositely disposed from the floor surface of the vehicle, it is possible for the light receiving element 1 to be free from the direct affection of the sunlight, which ensures that a desired signal is transmitted by means of infrared rays in a steady manner without fail.

What is claimed is:

1. A method for catching infrared rays in an on-vehicle signal transmission system using the infrared rays, comprising the steps of:

emitting said infrared rays from a transmitter toward a floor surface of said vehicle, said transmitter being carried by a driver of a vehicle; and installing a light receiving element in said vehicle in a manner such that said light receiving element is oppositely disposed from said floor surface, said light receiving element being adapted to receive said infrared rays.

2. An apparatus for catching infrared rays in an on-vehicle signal transmission system using the infrared rays, comprising:

a transmitter carried by a driver of a vehicle, said transmitter being provided with a light emitting element adapted to emit said infrared rays toward a floor surface of said vehicle; and a receiver provided with a light receiving element, said light receiving element being installed in said vehicle in a manner such that said light receiving element is oppositely disposed from said floor surface so as to receive said infrared rays.

3. The apparatus as set forth in claim 2, wherein:

a reflecting plate is mounted on said receiver; and said reflecting plate reflects said infrared rays toward said light receiving element from at least one of clothes of said driver, said vehicle's seat and floor.

4. The apparatus as set forth in claim 3, wherein:

said reflecting plate is adjustable in its angle of reflection.

5. In an apparatus for receiving infrared rays for transmitting a signal in an on-vehicle signal transmission system, comprising a transmitter adapted to be carried by a driver of a vehicle, said transmitter having a light emitting element, and a receiver provided with a light receiving element adapted to be positioned in the vehicle to receive infrared rays from said transmitter, the improvement wherein:

said light emitting element is adapted to point downwardly and comprises means for emitting said infrared rays toward a floor surface of the vehicle, and said receiver comprises means for receiving infrared rays reflected from the floor surface of the vehicle from said transmitter.

6. The apparatus of claim 5 mounted in said vehicle with said receiving element pointed downwardly toward said floor surface.

* * * * *